United States Patent Office 3,453,087
Patented July 1, 1969

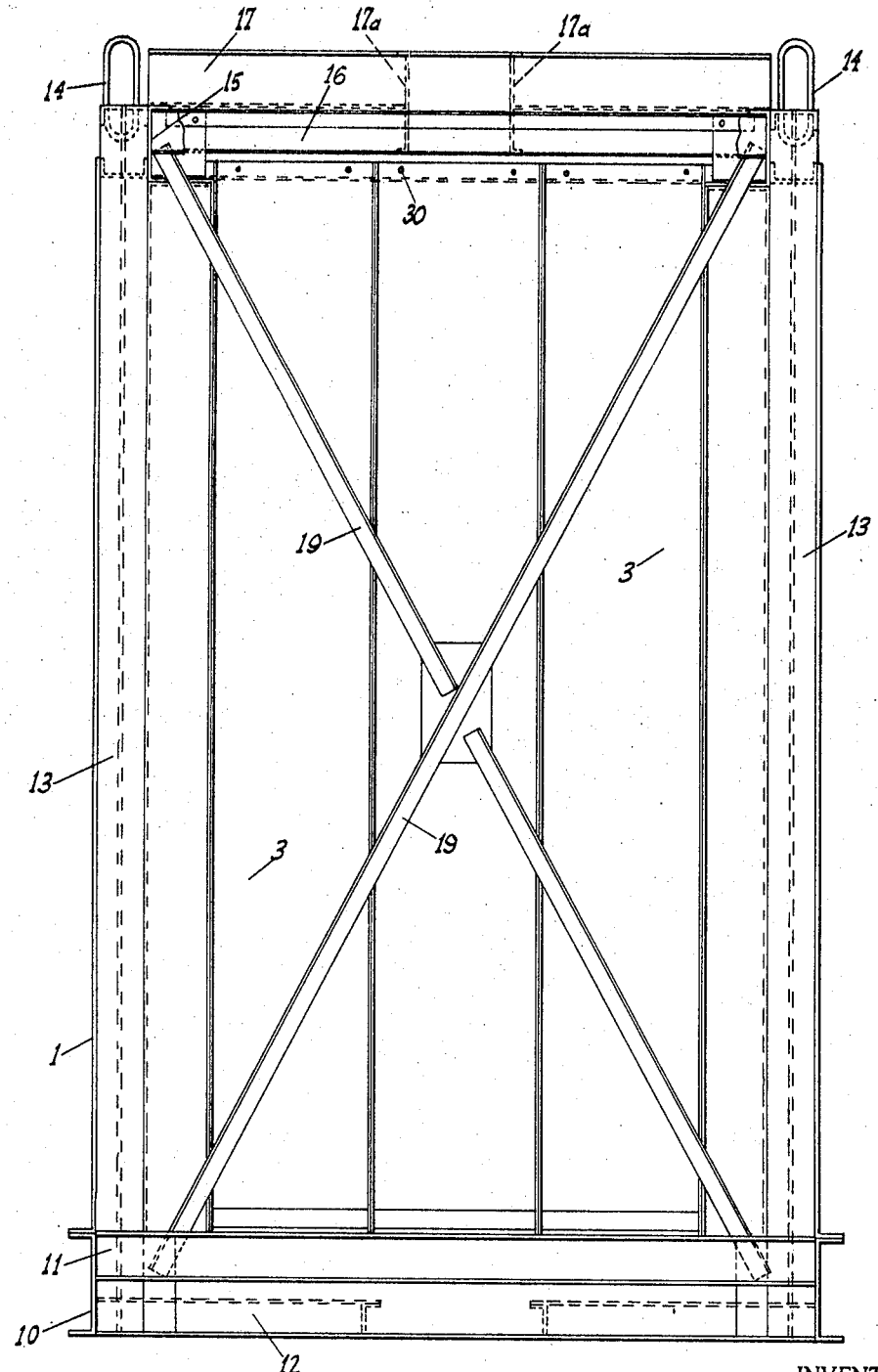

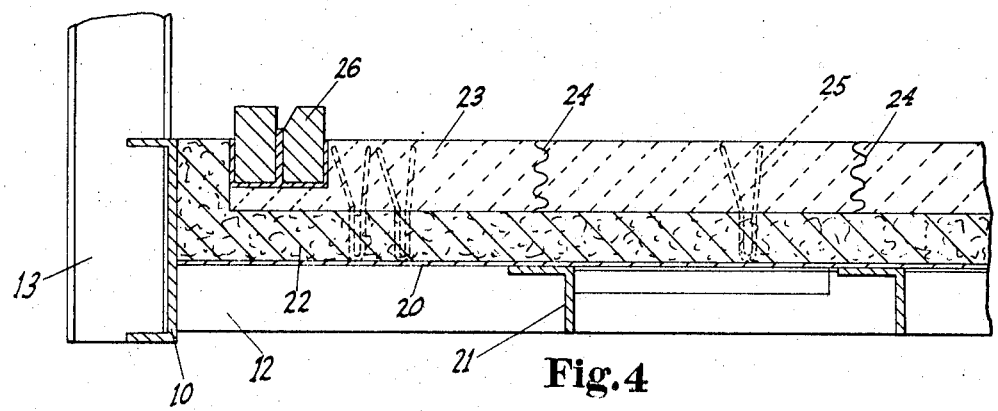
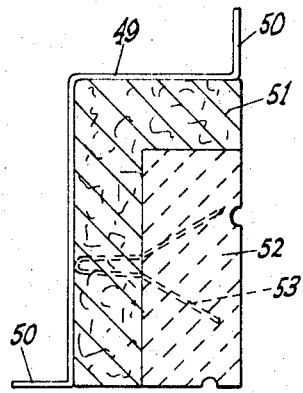
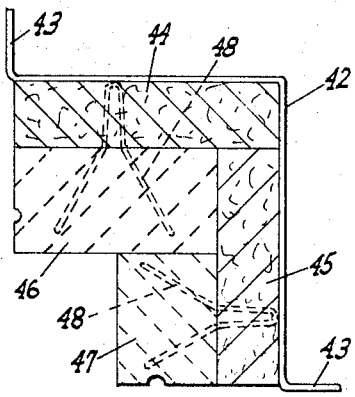
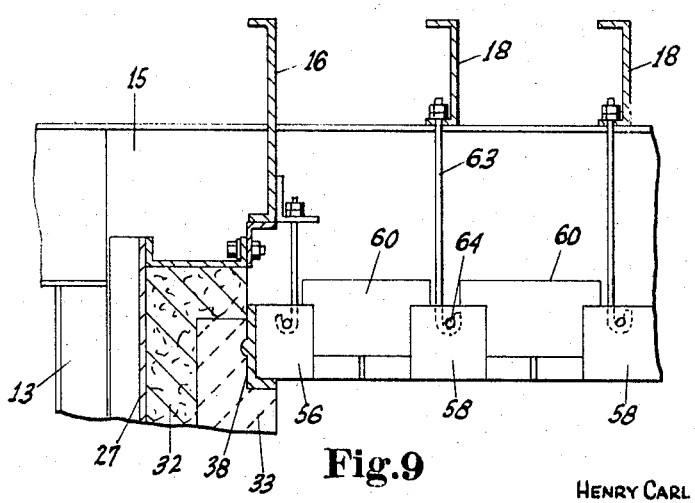

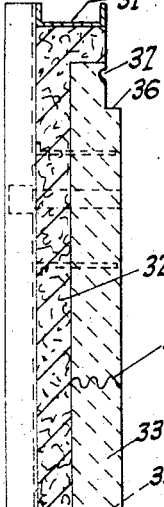
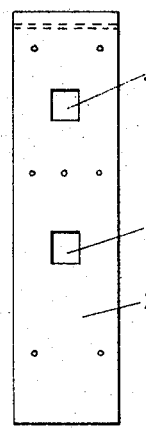
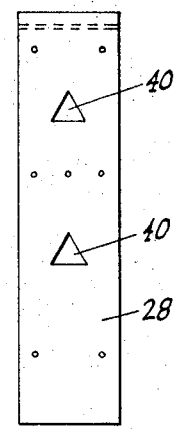
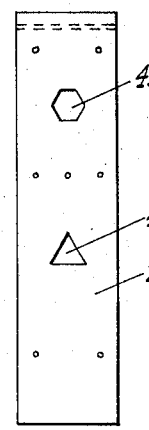
Fig.6a  Fig.6b  Fig.6c  Fig.6d
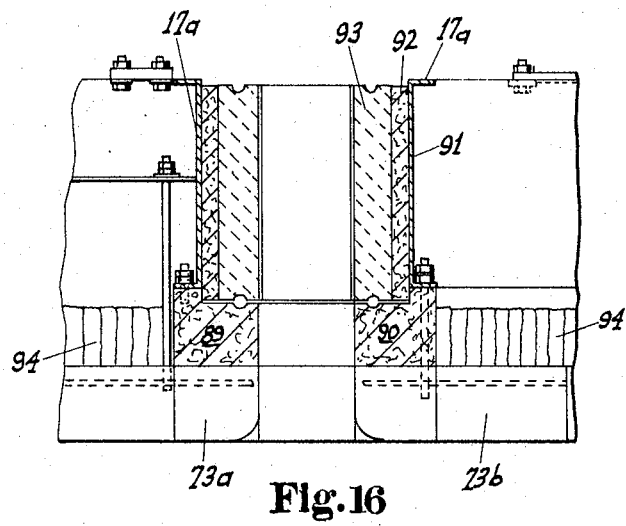
Fig.16
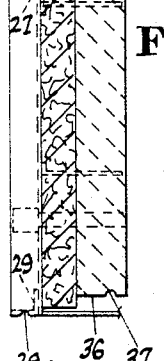
Fig.5

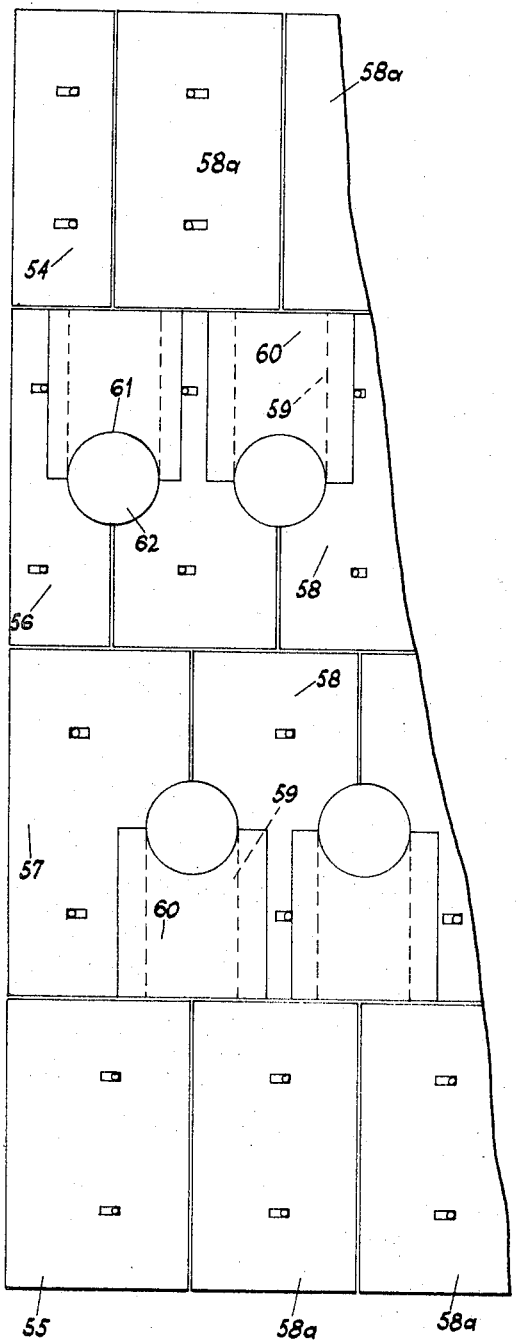
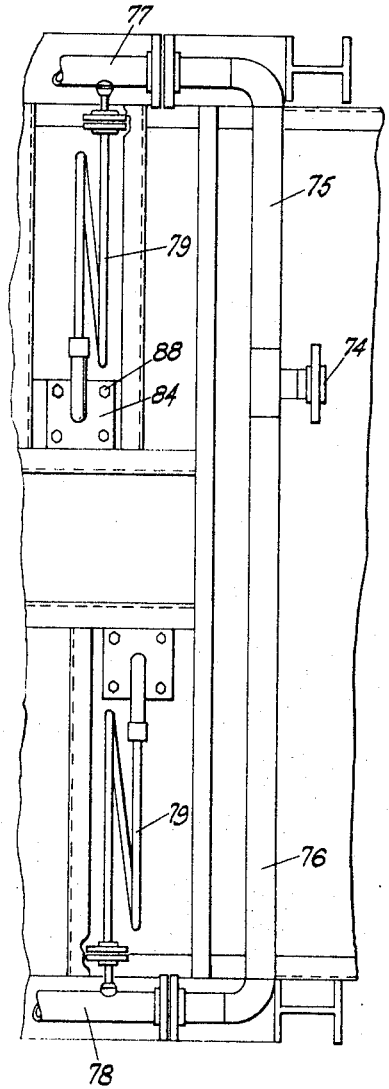
Fig. 8
Fig. 13

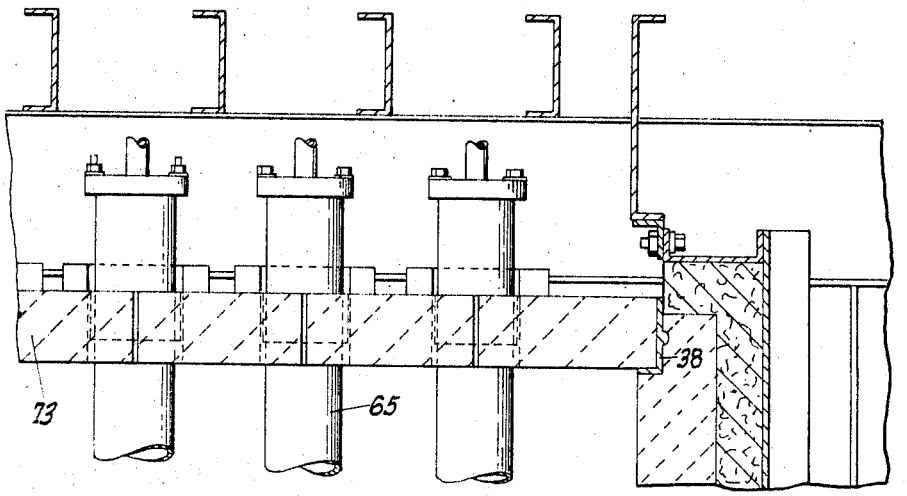
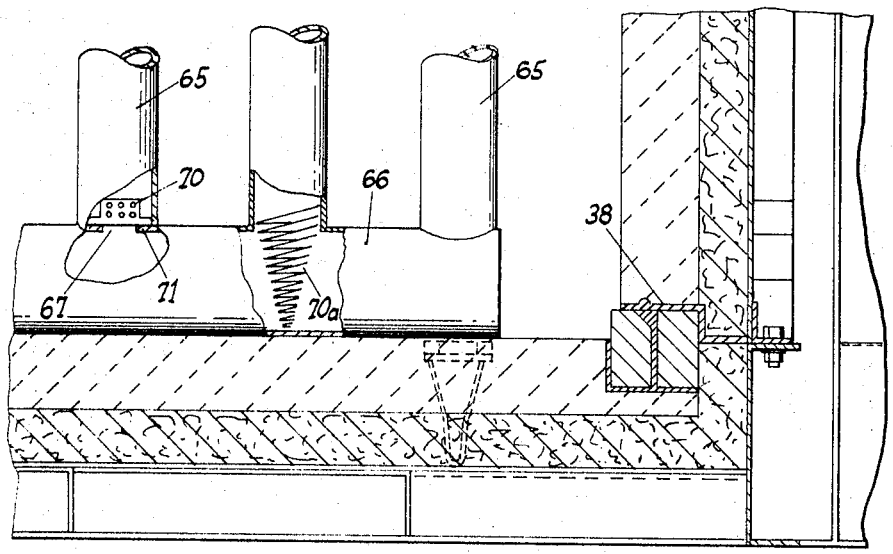
Fig. 11

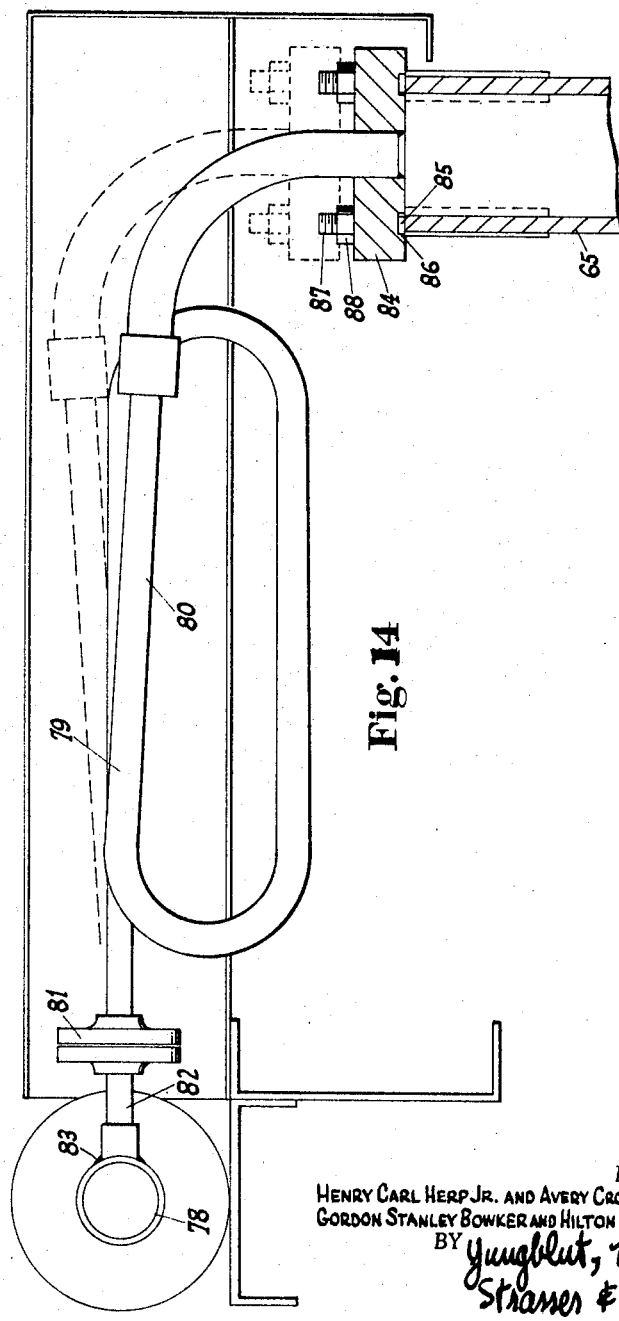

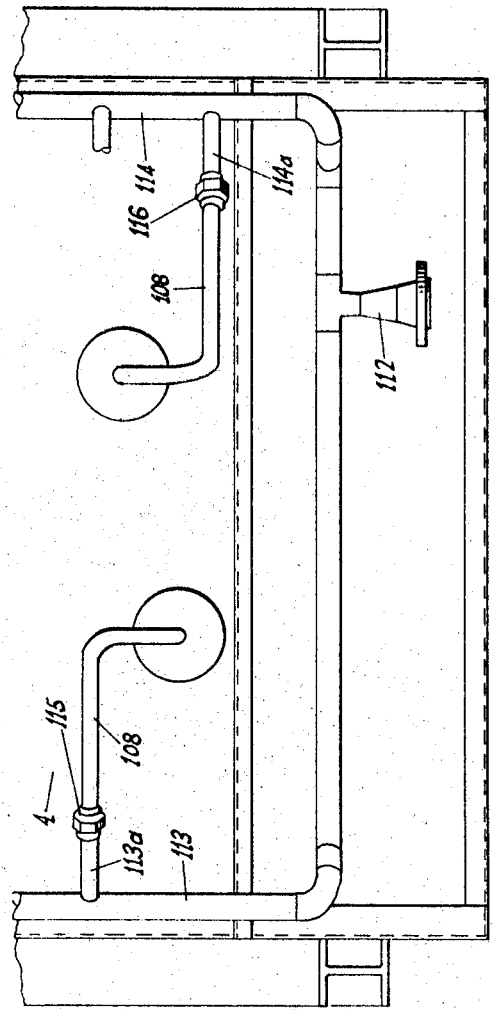
Fig.18
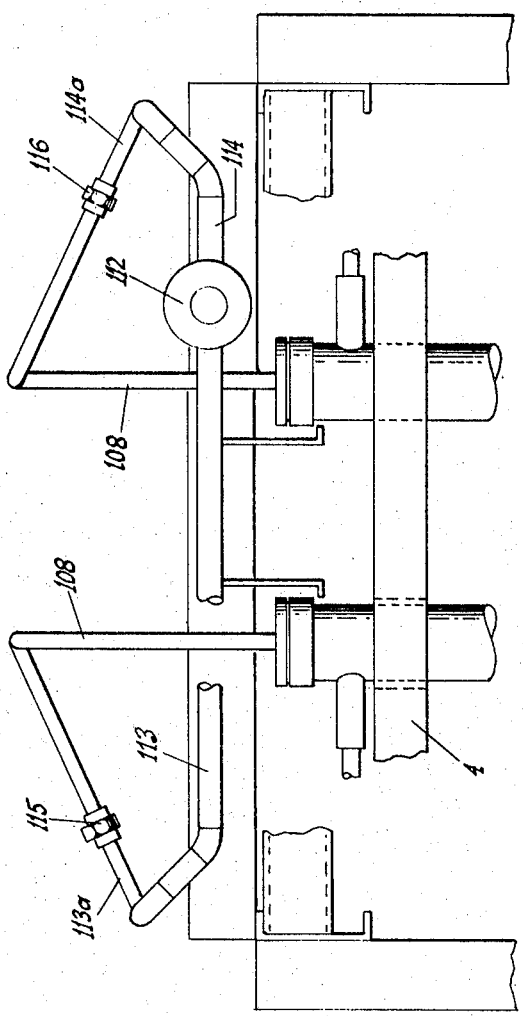
Fig.19
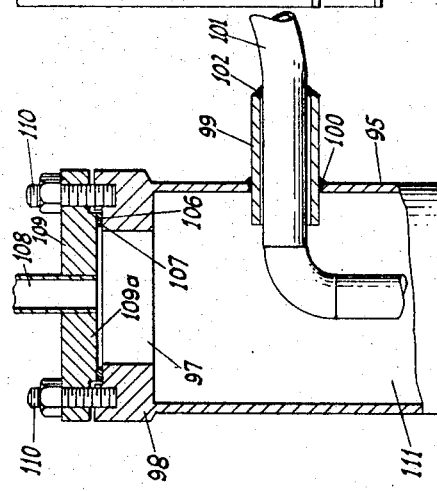
Fig.17
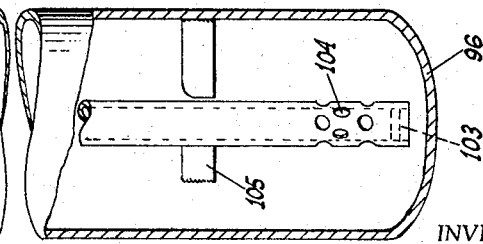
INVENTOR.
HENRY CARL HERP JR. AND AVERY CROWELL KELSALL AND
GORDON STANLEY BOWKER AND HILTON ALVIN BENNETT,
BY
*Jungblut, Melville,*
*Strasser & Foster*
ATTORNEYS.

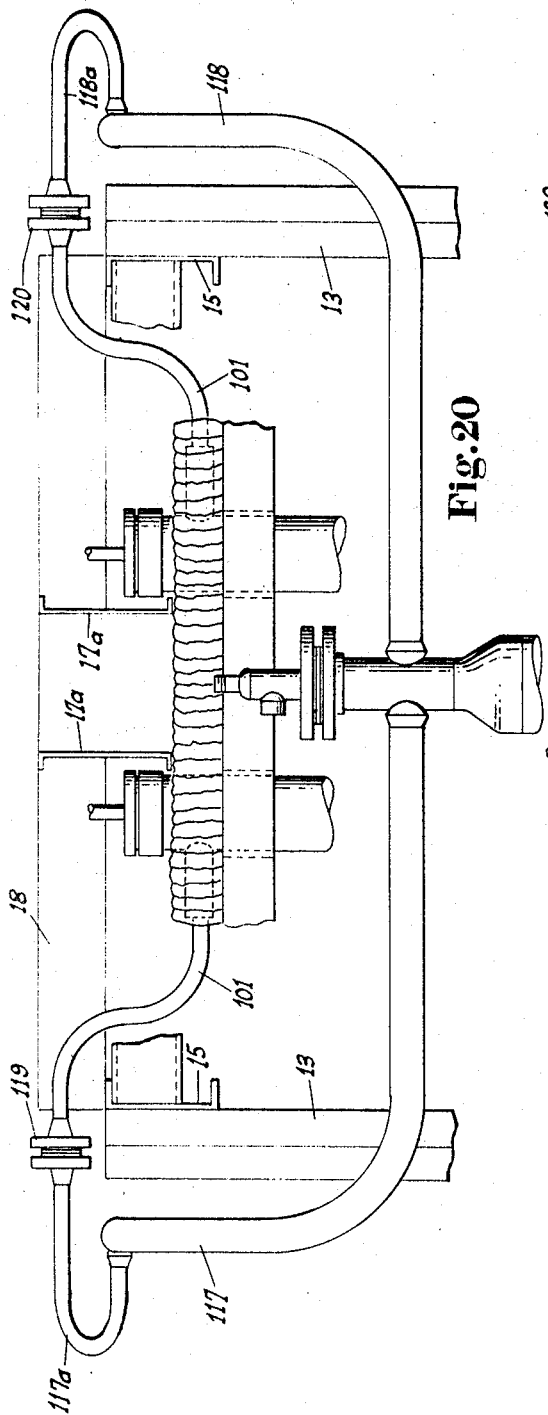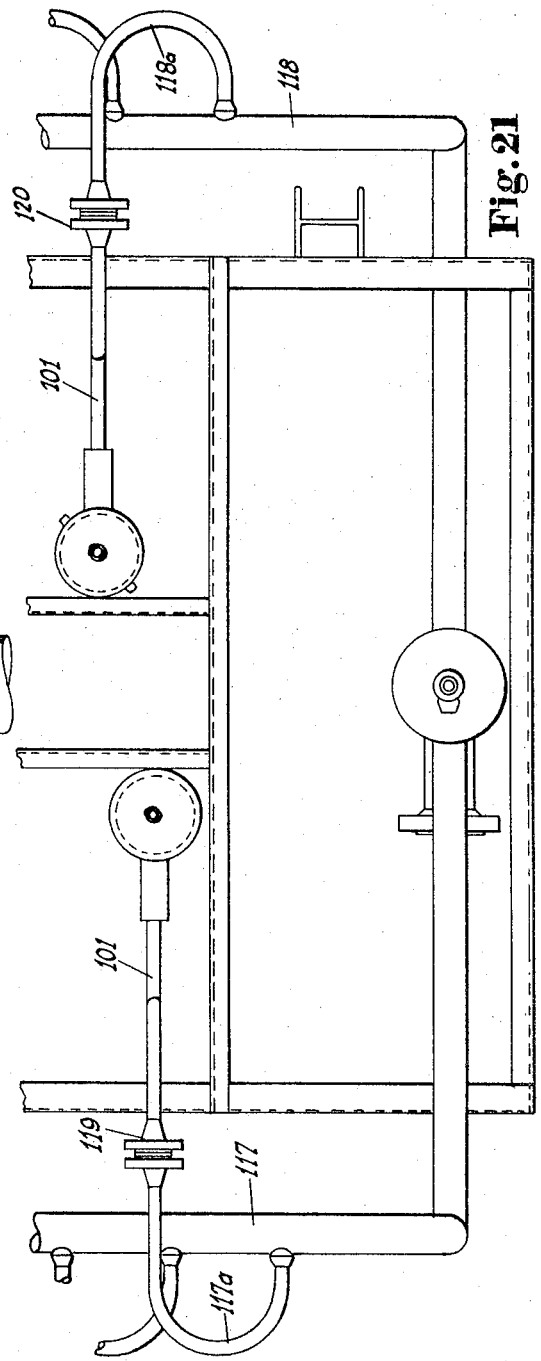

3,453,087
MODULAR REFORMER FURNACE
Henry Carl Herp, Jr., and Avery Crowell Kelsall, Louisville, Ky., Gordon Stanley Bowker, Clarksville, Ind., and Hilton Alvin Bennett, Jr., Louisville, Ky., assignors to Girdler Corporation, Louisville, Ky., a corporation of Ohio
Filed June 25, 1964, Ser. No. 377,942
Int. Cl. B01j 9/04; C01b 2/16
U.S. Cl. 23—288                    20 Claims

ABSTRACT OF THE DISCLOSURE

A modular reformer furnace which can be fabricated from a plurality of modules so as to have any desired capacity. The furnace comprises a base member forming a hearth, a furnace enclosure made up of a plurality of refractory lined panels and a refractory roof suspended on means extending across the furnace enclosure. The reformer furnace may be provided with either a plurality of vertical catalyst tubes arranged in harps or a plurality of eductor type catalyst tubes provided with suitable inlet and outlet means. The upper ends of the catalyst tubes extend through perforations in the roof.

---

The invention relates to an improved design for a furnace for carrying out catalytic reactions at elevated temperatures, and more particularly to a modular design for a furnace for carrying out endothermic catalytic reactions where heat must be supplied, such as the reactions of natural gas, propane, or other hydrocarbon mixtures with steam to produce hydrogen or synthesis gas mixtures.

Existing commercial furnaces for such reactions usually consist of a number of alloy tubes contained within a furnace box and connected to inlet and outlet headers. The tubes are filled with a catalyst suitable for use in the particular reactions. The hydrocarbon feed and steam, or other gaseous or vaporized substances to be reacted pass from the inlet headers to the catalyst-packed reaction tubes which are heated by means of burners within the furnace. The reactants flow through the catalyst-carrying tubes, causing the reaction to take place. The reaction products are withdrawn from the furnace via the outlet headers.

In general, such furnaces are commercially available only in certain models with particular capacities. If a particular capacity not readily available is desired, such a furnace must be designed and built specially. In most instances the furnace must be assembled at its ultimate site.

It is one the primary objects of the present invention to provide a furnace of modular design, that is, individual components of the furnace structure which serve the same function will be interchangeable in such a way that furnaces of various sizes and capacities may be obtained by the combination of these components or modules in building block manner.

It is an object of the present invention to provide a modular furnace for the purpose described which will be easy and inexpensive to manufacture.

It is an object of the present invention to provide a furnace of the type described which is adaptable to shop fabrication.

It is an object of the present invention to provide such a furnace in which the problem of differential expansion of the catalyst-carrying tubes has been greatly minimized.

It is an object of the invention to provide a furnace which is efficient, said sufficiently compact for skid mounting and shipment by rail, highway or other modes of transportation.

It is an object of the invention to provide a furnace which may be shipped to its ultimate site in completed form requiring a minimum amount of time to place it in full operation.

It is an object of the present invention to provide a modular furnace characterized by easy access to its various components for inspection, replacement, repair or servicing.

It is an object of the present invention to provide a modular furnace, parts of which may be easily replaced with a minimum of shutdown time.

These and other objects of the invention which will be described hereinafter or will be apparent to one skilled in the art upon reading these specifications, are accomplished by that structure and arrangement of parts of which exemplary embodiments will now be described. Reference is made to the accompanying drawings wherein:

FIG. 3 is an end elevation of the furnace panels and external framework.

FIG. 4 is a partial cross sectional view of the furnace hearth.

FIG. 5 is a longitudinal cross sectional view of a wall panel.

FIGS. 6a through 6d are diagrammatic elevational views of various forms of wall panels.

FIGS. 7a and 7b are transverse cross sectional views of two forms of corner wall panel members.

FIG. 8 is a partial plan view of the arch or roof assembly of the furnace of the present invention.

FIG. 9 is a partial cross sectional view illustrating the arch assembly and mounting means therefor.

FIGS. 10 and 11 are partial vertical cross sectional views showing the tube assembly or "harp" construction of the present invention.

FIG. 13 is a partial plan view showing the inlet manifold assembly.

FIG. 14 is a view showing the inlet expansion loop assembly, certain adjacent parts being in cross section.

FIG. 16 is a partial transverse sectional view of the upper part of the furnace showing the flue construction.

FIG. 17 is a vertical cross sectional view of a modified form of reformer tube for use in the modular furnace of the present invention.

FIG. 18 is a partial plan view showing the inlet manifold assembly for reformer tubes of the type shown in FIG. 17.

FIG. 19 is a partial elevational view of the inlet manifold assembly of FIG. 18.

FIG. 20 is a partial plan view showing the outlet manifold assembly for reformer tubes of the type shown in FIG. 17.

FIG. 21 is a partial elevational view of the outlet manifold assembly of FIG. 20.

The invention will be described herein in exemplary embodiments constituting reformer furnaces and parts thereof, it being understood that this does not constitute a limitation on the invention. Briefly, the modular reformer furnace of the present invention comprises a rectangular steel furnace body made up of panels with their interior surfaces lined with insulating and refractory substances, and forming side walls. Multiple alloy steel tubes, carrying a catalyst for promoting the desired reactions are located in the furnace body and provided with inlet headers without the furnace body and outlet headers within the furnace body. The furnace is provided with multiple burners located in its side walls or its bottom and adapted to properly heat the catalyst-carrying tubes.

Figure 1:
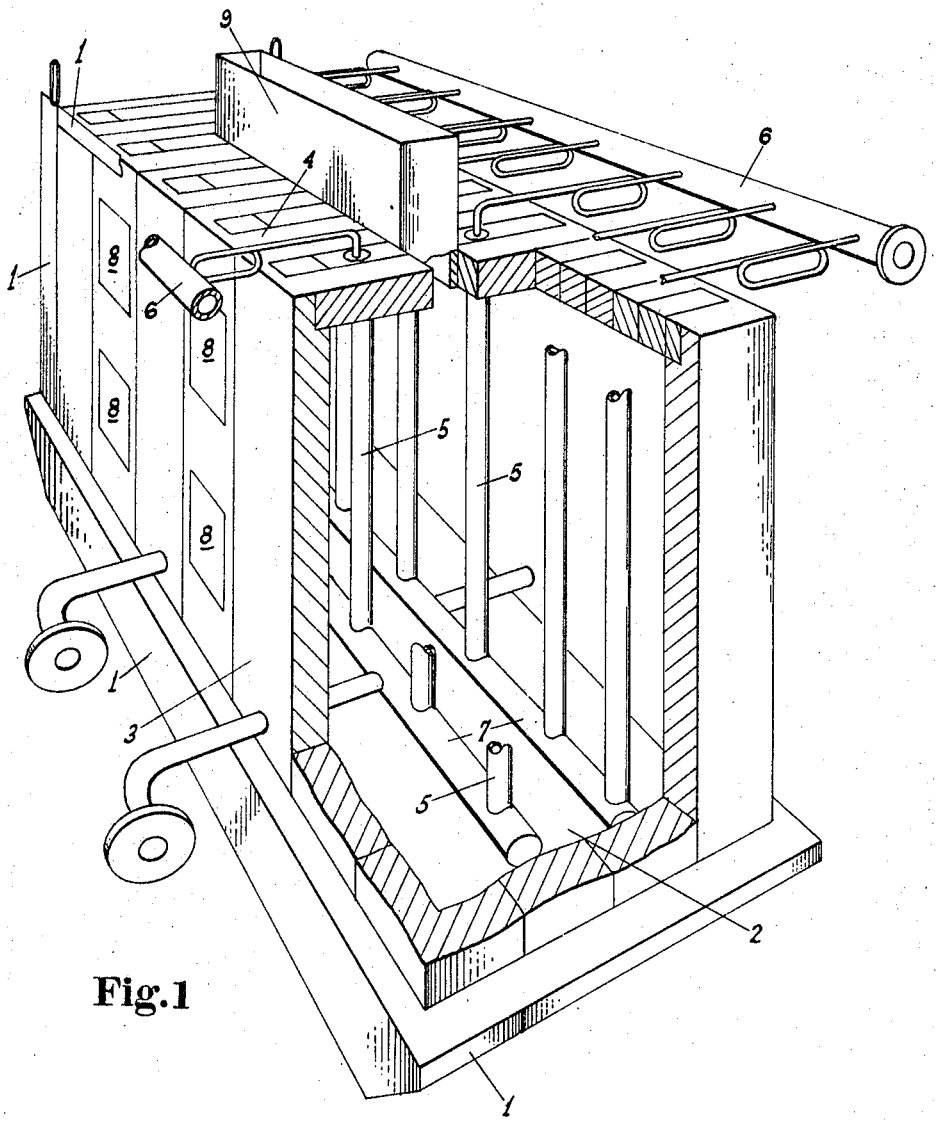
FIG. 1 is a diagrammatic perspective view of the modular reformer furnace of the present invention.

FIG. 1 is a partial diagrammatic view of a furnace of the present invention. The various elements illustrated therein may be listed as follows:

External framework 1
Side wall panels 3
Catalyst-carrying tubes 5
Outlet headers 7
Flue gas outlet 9
Hearth 2
Arch or roof assembly 4
Inlet headers 6
Burners 8

*The external framework*

While relatively small furnaces may be constructed from the various modules hereinafter described without a surrounding framework, in most instances a framework as distinct from the several panels and other modular elements is desirable, not only to unify, rigidify and support the furnace structure, but also in many instances to provide a shop assembled or "package" structure which may be handled and shipped as such, and installed by resting it directly on a concrete floor, slab or the like.

Figure 2:
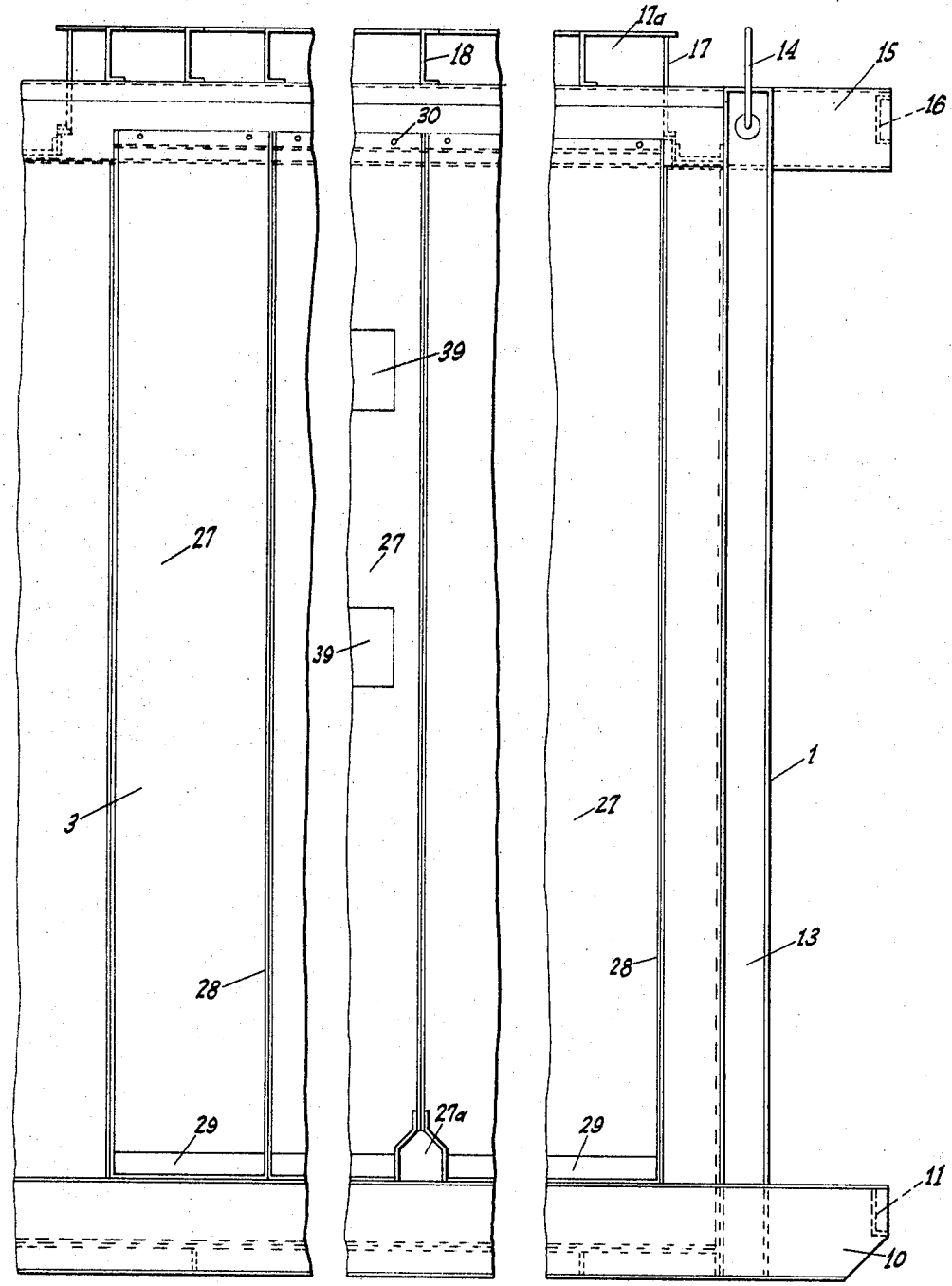
FIG. 2 is a partial side elevation of the furnace framework and side panels.

Referring to FIGS. 2 and 3, the modular reformer furnace of the present invention is provided with an external supporting framework generally indicated at 1. The bottom portion of the framework comprises a skid made up of side members 10 and end members 11 and 12. It will be noted that the side wall panels (generally indicated at 3) may be affixed to the members 10 and 12 by any suitable means including bolts or the like. As will be understood by one skilled in the art, additional bracing, (such as 21 in FIG. 4) will be provided between the members 10 and 12 to support the furnace hearth. At each corner there is an upstanding elongated frame member 13, each of which may be provided with a ring or link 14 enabling the furnace to be crane-handled. The top portion of the framework comprises side members 15 and end members 16 and 17. Two frame members 17a in spaced relationship to each other extend between the end members 17. These members serve as the support for the flue gas outlet 9 of FIG. 1. Additional frame members, generally indicated at 18, extend from the members 17 to the side elements 15. The frame members 18 serve to support the arch or roof assembly as will be hereinafter described more fully. Additional framework elements may be provided where needed, as for example that shown at 19.

*The hearth*

FIG. 4 is a cross sectional view of the hearth assembly. The hearth comprises a metallic bottom 20 supported by the frame members 10 and 12, as well as additional framework generally indicated at 21. The sides of the hearth are formed by the frame members 10 and 12. The bottom and sides of the hearth are covered by insulating block generally indicated at 22. While other materials could be used, the insulating structure is preferably made up of refractory mineral fibers, in block form, the blocks being cemented to the metal structure forming the hearth bottom and sides.

The insulative structure 22 is faced on its upper side with refractory as at 23. Various structures are possible here including the use of refractory brick; but it is preferred to apply the refractory as a plastic or cementitious substance to the hollow interior of the hearth as will be clear from FIG. 4. Refractories which may be so applied are known in the art, an exemplary one being Kast-O-Lite, a lightweight castable refractory manufactured by A. P. Green Fire Brick Company, or equivalent material.

Rod-like anchor means 25 may be used to hold the insulative material in place. The anchors 25 comprise metallic rods bent in a V-shaped configuration with the bottom of the V-shaped configuration affixed to the hearth bottom 20 in any suitable manner such as by welding or the like. The anchors 25 extend through the insulative block into the castable refractory material. It will be noted that strips of corrugated material such as aluminum or the like may be embedded in the castable refractory material to localize any tendency toward cracking and to provide interlocks. Two such corrugated strips are shown at 24 with the corrugations extending horizontally. About the periphery of the hearth, inside the insulative block, refractive material 26 may be embedded in the castable insulative material 23. The refractive material 26 will cooperate with similar material on the furnace side wall panels to give a continuous refractory surface right down to the hearth itself.

*Side wall panels*

The wall panels forming the furnace sides are most clearly shown in FIGS. 2, 3 and 5. The side wall panels comprise elongated metallic plates 27 with outwardly extending longitudinal flanges 28 along their side edges. The panels 27 are provided with angles 29 extending between the flanges 28 along their bottom edges. The angles 29 are provided with suitable perforations 29a by means of which the panels may be affixed to the frame members 10 or 12. The upper side of the plates are provided with perforations or notches 30 by means of which they may be bolted to the frame members 15 or 17. The individual panels 3 or 27 may be joined together by any suitable means, including bolts extending through adjacent pairs of the flanges 28.

Figure 10:
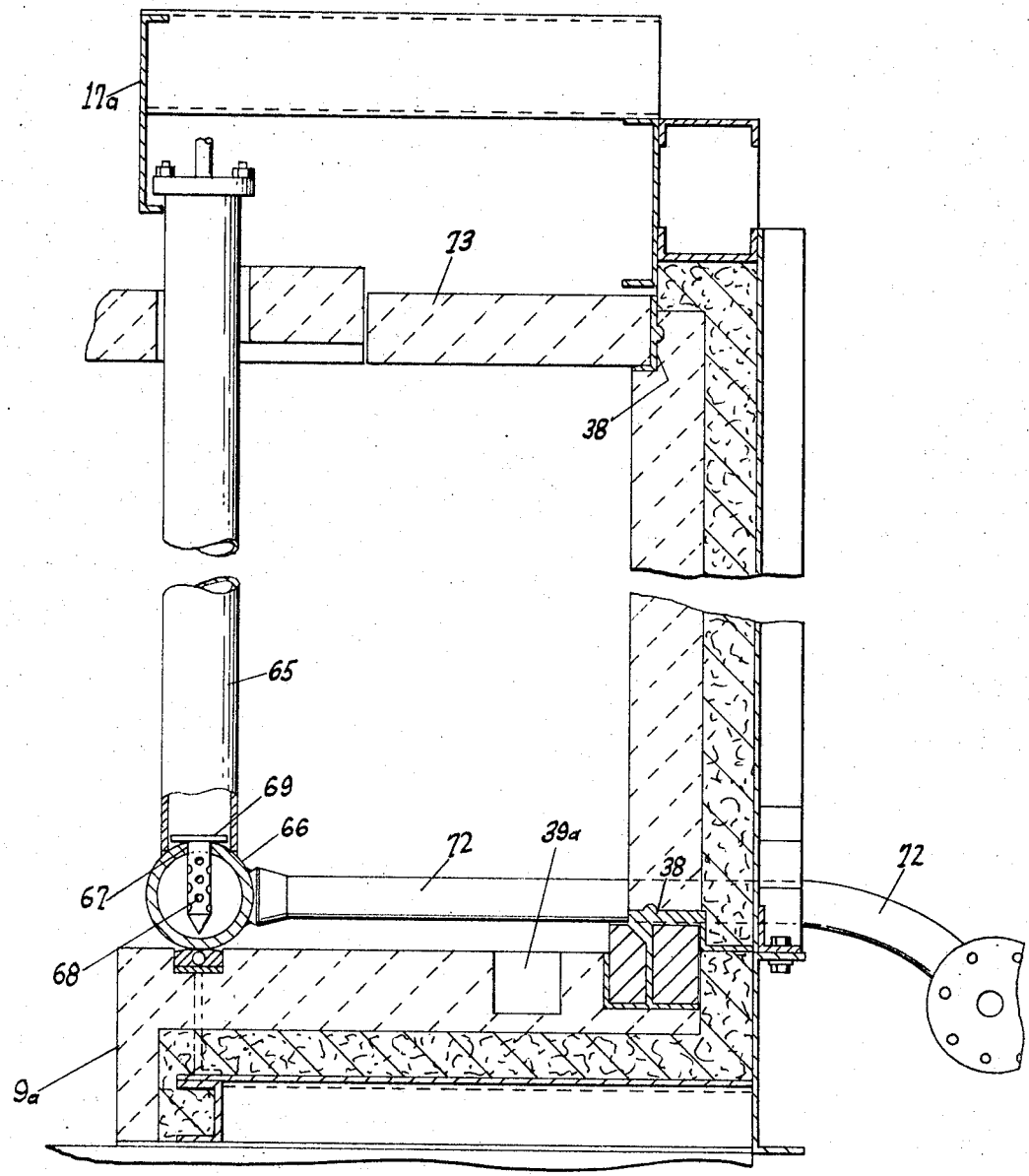

FIG. 5 is a cross sectional view of an exemplary form of side wall panel. The panel 27 is provided at its upper end with a channel 31 affixed to its inside surface. The inside surfaces of the channel 31 and the panel 27 are covered with a layer of insulative block 32 which may be similar to that described above. Against the insulative block 32 is cast a layer of castable refractory material 33 which may be of the type described above, preferably provided with corrugated members 34 similar to the members 24 of FIG. 4. The anchor means 35 will also be provided. These may be of the type shown at 25 in FIG. 4, or they may simply be metallic, rod-like members with one end bent over and welded to the plate 27. The castable layer of refractory material may be recessed at both ends as at 36 and provided with grooves 37. This construction permits and insures the placement and retention of sealing material 38 between the layer 33 and the arch or roof assembly at one end and the refractory material in the hearth at the other. This is illustrated in FIG. 10. The sealing material 38 will preferably be any of the known high temperature, semi-rigid sealants useful for filling small spaces and adhering to adjacent refractory where significant structural strength is not required.

FIGS. 6a through 6d illustrate various exemplary modular forms of the side wall panel 27. In FIG. 6a the panel 28 is provided with burners 39. The burners 39 may be of any suitable type, well known in the art, which cause combustion to occur along the furnace wall with essentially no flame travel toward the center of the furnace chamber. Such burners provide a flame pattern producing a radiant wall effect in connection with the castable refractory layer 33. This permits a high rate of radiant heat transfer from the furnace walls to the catalyst-carrying tubes without danger of flame impingement on the tubes, or localized over-heating thereof.

It will be understood that it would not constitute a departure from the spirit of the invention to provide burner means in the furnace hearth. This is diagrammatically indicated at 39a in FIG. 10. Such hearth mounted burners may be of any suitable type such as burners adapted to throw a flat sheet of flame up the side walls of the furnace, and the like.

In FIG. 6b a panel 27 is illustrated having two sight ports 40. The panel of FIG. 6c has a flame detection device such as a Fire Eye 41 in its upper portion, and a sight port 40 in its central portion. The panel illustrated in FIG. 6d is similar to that shown in FIG. 6c, differing only in that the positions of the sight port and Fire Eye have been reversed.

It will also be understood by one skilled in the art that plain panels may be provided where necessary. Such panels are shown in FIGS. 2 and 3. Panels may also be provided with notches 27a at their bottom edges (FIG. 2) to permit pipes to extend through the furnace walls as described hereinafter.

FIGS. 7a and 7b illustrate two modular forms of wall corner panels. The wall corner panel of FIG. 7a comprises a metallic corner panel 42 of angle iron cross section, the legs or sides of which are equal in width and are provided with flanges 43 at their outer edges. The flanges 43 are adapted to cooperate with the flanges 28 on the side wall panels 27. The wall corner of FIG. 7a has a layer of insulative block 44 along one inside surface, and a layer of insulative block 45 along the other inside surface, abutting the layer 44. There is also a layer of castable refractory, cast in two parts, 46 and then 47. Again, anchors 48 may be used as described above.

The wall corners of FIG. 7b comprise a corner panel 49 of angle iron cross section, one side of which is substantially wider than the other. The corner panel 49 is provided with flanges 50 adapted to cooperate with the flanges 28 on the side wall panels 27. The wall corner of FIG. 7b is also provided with a layer of block insulative material as at 51 and a layer of castable refractory as at 52, which in this instance may be cast in one operation. Further, with this construction, anchor means need be provided only on the longer side of the panel 49 as is shown at 53.

Depending upon size or other considerations, an end portion of the furnace may be made up from two corner panel members attached together, or from two corner panels in separated position with another panel or panels therebetween. The width of the sides of the corner panels may be varied as desired to permit the positioning of the vertical catalyst-carrying tubes in off-set relationship.

Arch or roof assembly

FIG. 8 is a partial plan view illustrating the arch only and showing the various building blocks or modules comprising the arch. As will be understood by one skilled in the art, the seven distinct types of arch blocks shown in FIG. 8 may be combined to make an arch of any desired length. The two corner blocks 54 and 55 as well as the two edge blocks 56 and 57 therebetween differ respectively from each other due to the fact that the rows of catalyst-carrying tubes which extend upwardly through the arch are staggered in the direction of the length of the furnace. The remainder of the longitudinal edges of the arch may be made up of rectangular blocks 58a. The blocks 56, 57 and 58 (forming the central portion of the arch) are all appropriately notched to provide slots 59 in the arch having rounded ends. The final block 60 is adapted to lie on adjacent pairs of blocks forming the central portion of the arch (see also FIG. 9). The blocks 60 have a downwardly depending portion which fits into the slots 59. The blocks 60 are provided with rounded notches 61 which cooperate with the rounded ends of the slots 59 to form circular perforations through the arch, generally indicated at 62. The catalyst-carrying tubes are adapted to extend upwardly through the arch via the perforations 62.

The several blocks will, of course, be made of refractory substance similar to fire brick or castable refractory.

FIG. 9 is a partial cross sectional view showing the mounting of the various arch blocks. As is well known in the art, the arch blocks are suspended from the upper members of the external framework by means of hangers or hooks 63 engagaing rod-like means 64 within the blocks themselves. It will be noted from FIG. 9 that the blocks 60 simply rest on the blocks 56 and 58. It will further be noted that a gas tight seal is provided between the insulative block and castable refractory of the side wall member and the edge-most arch blocks as at 38.

The catalyst-carrying tubes and outlet manifold

The catalyst-carrying tubes and outlet manifold therefor are most clearly shown in FIGS. 10 and 11. The catalyst-carrying tubes 65 are joined at their bottom ends to the outlet header 66 by any suitable means such as welding or the like. The outlet header 66 is located within the furnace chamber and rests on the hearth at as low a position as possible to enable the overall height of the furnace to be as little as possible. The tubes 65 will be filled with a suitable catalyst for the promotion of the desired reaction. Such catalyst usually takes the form of rings or extruded pellets. It has been found desirable to provide a catalyst support to prevent the catalyst from falling from the tube 65 into the header 66. One form of catalyst support is illustrated in FIG. 10. It will be noted that the perforation 67 in the outlet header 66 leading to the tube 65 is of smaller diameter than the internal diameter of the tube. This construction provides a shoulder for retaining the catalyst support and reinforcement for the tube opening. The catalyst support 68 may comprise a loose-fitting perforated sleeve closed at one end and with a flange 69 at the top thereof which cooperates with the shoulder formed by the perforation 67 to hold the catalyst support 68 in place.

A second form of catalyst support is illustrated in FIG. 11. In this instance the catalyst support comprises a loose-fitting perforated sleeve 70, closed at the top end, and provided at the other end with an annular outwardly extending flange 71. The flange 71 rests on the shoulder formed by the perforation 67 in the outlet header 66.

In some instances it may be desirable to make the perforation 67 in the outlet header 66 of the same diameter as the internal diameter of the tube 65. When this is the case, other suitable forms of catalyst supporting means may be used, as for example, a helical coil of small diameter wire as shown at 70a in FIG. 11.

The outlet header 66 may be anchored at its center to the hearth by any suitable means well known in the art. The ends of the outlet headers may be supported on rollers or bearing plates if desired.

Each outlet header 66 will be provided with a laterally extending pipe 72 leading to the outside of the furnace (see FIG. 10). At the points where the pipes 72 extend through the furnace wall, suitable sealing means, well known in the art, will be employed. The reaction products will leave the furnace via the pipes 72 for collection and further processing.

Each outlet header 66 and the catalyst-carrying tubes 65 connected thereto constitute a "harp." The furnace of the present invention will have at least two such harps in spaced parallel relationship transversely of the furnace. The vertical tubes in one harp will be staggered with respect to those in the nearest parallel harp to provide maximum exposure of all tube surfaces to the radiant heat sources.

As will be understood by one skilled in the art, the inside and outside diameters of the tubes 65 and outlet header 66 as well as the center-to-center spacing of tubes 65 on the header and harp-to-furnace wall spacing will depend upon a number of variables, as for example the reaction to be carried out, the catalyst used, the type and placement of burners, and the like.

While dimensions do not constitute a limitation on the present invention, for purposes of an exemplary description, a furnace of the type contemplated herein may have catalyst-carrying tubes of an overall diameter of 4⅝ inches. The tube center-to-center spacing may be 9 or 10 inches, while the harp-to-harp center spacing may be 18 inches. In carrying on certain endothermic reactions, particularly with a relatively finely divided catalyst, flow volumes may be maintained by making the tubes 65 relatively short, e.g. 10 to 12 feet in length. This enables the overall height of the furnace to be diminished.

The outlet header 66 may be of 6 inch pipe size to provide a rugged tube support and manifold having a high capacity for gas flow. Such a size also permits ample room for the catalyst support as shown in FIGS. 10 and 11 with ample gas passage thereabout. Furthermore a 6 inch pipe size provides an outlet manifold of sufficient strength to properly support the tubes 65.

Figure 12A:
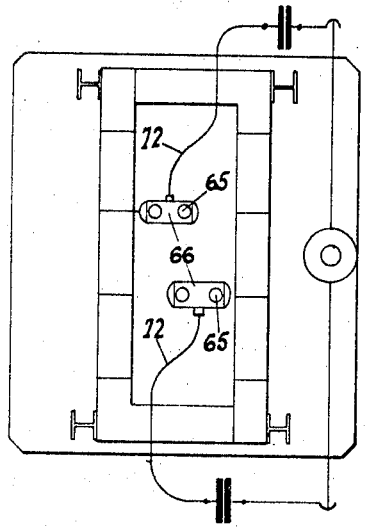
FIGS. 12a through 12e illustrate various embodiments of the modular design of the present invention, showing furnaces of various harp combinations.
Figure 12B:
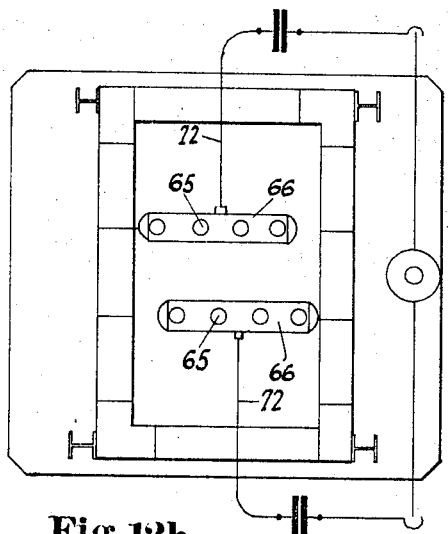
Figure 12C:
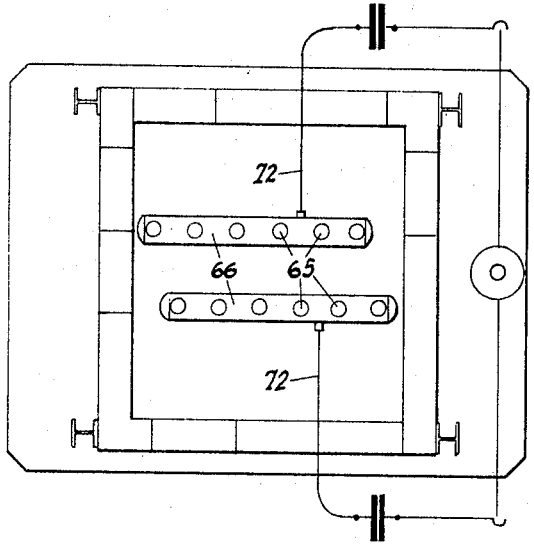
Figure 12D:
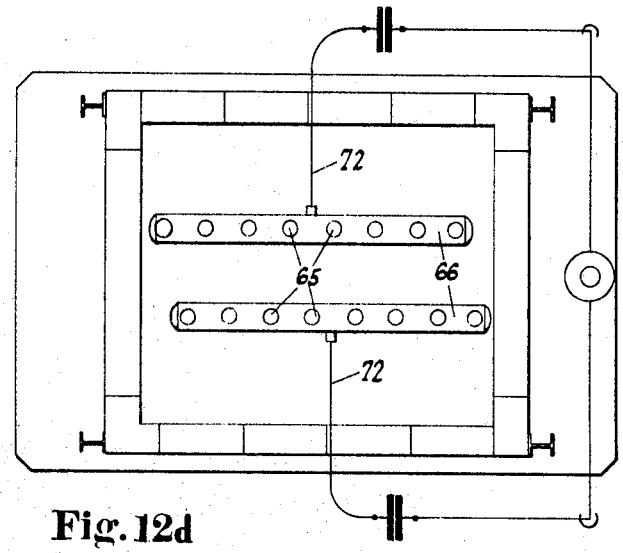
Figure 12E:
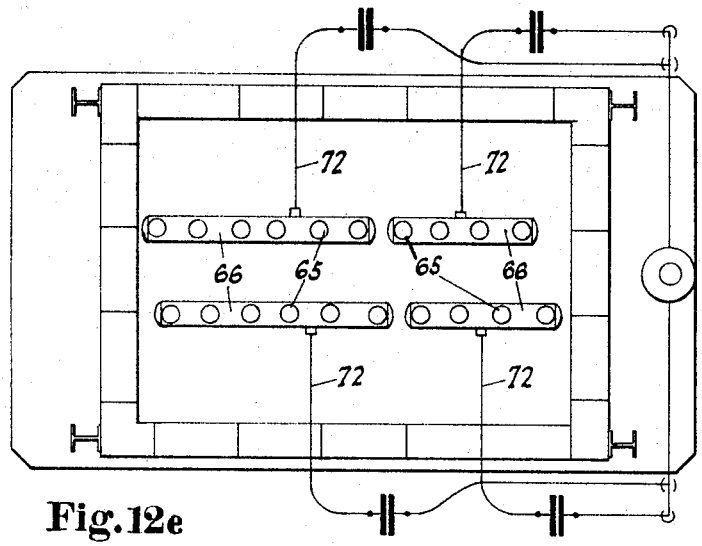

FIGS. 12a through 12d are diagrammatic representations of various harp modules of the present invention in modular furnaces of appropriate sizes. These figures illustrate 2, 4, 6 and 8 tube harps which may be used in 4, 8, 12 and 16 tube reformer furnaces. Reformer furnaces with greater numbers of tubes can be achieved by combining the various harp modules of FIGS. 12a through 12d. As an example, FIG. 12e illustrates a 20 tube reformer made up of two staggered parallel rows of tubes, each row comprising a six and a four tube harp module.

*Catalyst-carrying tubes and inlet headers*

As is best shown in FIGS. 10, 11, 13 and 14, the catalyst-carrying tubes 65 extend through and above the arch which is generally indicated by the index numeral 73. This construction provides catalyst-carrying tubes 65 which are restricted at one end (i.e. within the furnace box by the outlet headers 66 located at the hearth) and non-restricted and free to expand at their upper ends. This is of importance for a number of reasons. It has been found in reformer furnaces having a plurality of catalyst-carrying tubes, that upon heating, the tubes tend to elongate. Furthermore, this elongation is unequal tube by tube. The tube elongation results from one or a combination of causes: unequal gas flow, unequal heating of the tubes, different creep rates of the tubes, and the fact that once a tube starts to bow toward the heat source the condition tends to get progressively worse.

Furthermore, the fact that the tubes 65 extend through and above the arch permits catalysts to be loaded into the tubes, and deteriorated catalyst removed from the tubes easily and conveniently.

The removal of spent catalyst from such tubes may be accomplished by applying a vacuum to the top of the tube and drawing the spent catalyst out when the furnace is out of operation. In the event that the catalyst plugs a tube, the provision of an open upper tube end allows for easy drilling out of the hardened catalyst plug. Removal of the catalyst support may be accomplished in various ways.

FIG. 13 is a plan view of the inlet manifold assembly. The reactants will be fed into the T-connection 74 and thence through conduits 75 and 76 to the inlet manifolds 77 and 78 (one to each of the parallel spaced harps or harp combinations). The manifolds 77 and 78 are each provided with an expansion loop 79 for each catalyst-carrying tube 65 fed thereby. FIG. 14 illustrates one of the expansion loops 79. The loop as shown in full lines represents its position when the catalyst-carrying tube 65 is in its "cold" or unexpanded condition. The loop 79 as shown in dotted lines illustrates its position when the tube 65 is in its "hot" or expanded condition. It will be noted from the drawing that the portion 80 of the expansion loop 79 will absorb substantially all of the distortion caused by the expansion of tube 65, thereby obviating any stress at the gasketed connection 81 between the inlet header 78 and the expansion loop 79, as well as at the weld 83 between the connector 82 and the inlet header 78. The internal diameter of the loop 80 has been increased at its discharge end to reduce the process stream velocity and minimize jetting of the catalyst in the reactant tube.

FIGS. 13 and 14 also illustrate the connection between the expansion loop and the top of a catalyst-carrying tube 65. The inlet expansion loop 79 is provided at its outlet end with a rectangular flange 84. The rectangular flange 84 may be affixed to the inlet expansion loop in any suitable gas-tight manner including threading, welding or the like. The under side of the flange 84 is provided with an annular groove 85 having a gasket 86 against which the upper edge of the tube 65 bears. Each of the catalyst-carrying tubes 65 are provided at their upper ends with four threaded studs affixed to the outer surface of the tubes. The threaded studs 87 are adapted to pass through appropriate perforations in the flange 84 to be engaged by nuts 88 whereby the flange 84 is firmly affixed to the tube 65 in gas-tight fashion. This construction has the advantage of insuring uniform compression of the gasket 86 effective throughout the entire area of the machine finished upper edge of the tube 65. Thus it will be seen that detachment of the flange 84 from the tube 65 and detachment of the inlet expansion loop from the inlet header 78 at 81 will provide easy access to the inside of the catalyst-carrying tube 65.

Figure 15A:
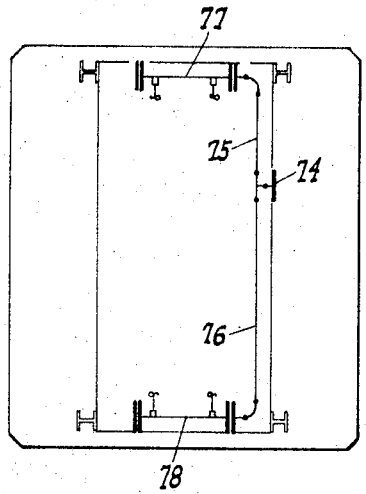
FIGS. 15a through 15e are diagrammatic representations illustrating furnace modules employing various inlet header arrangements and exemplary combinations of them.
Figure 15B:
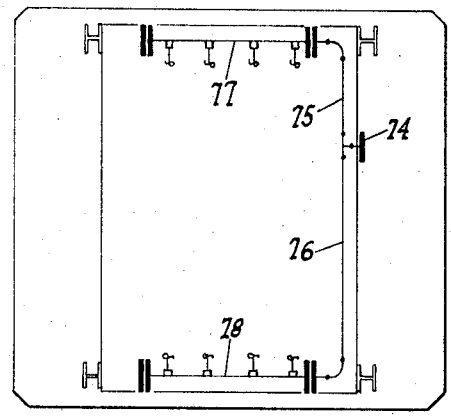
Figure 15C:
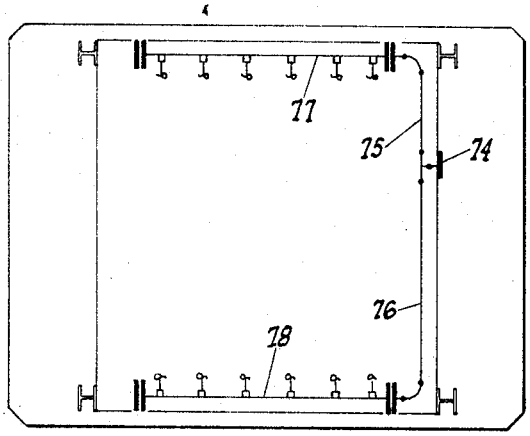
Figure 15E:
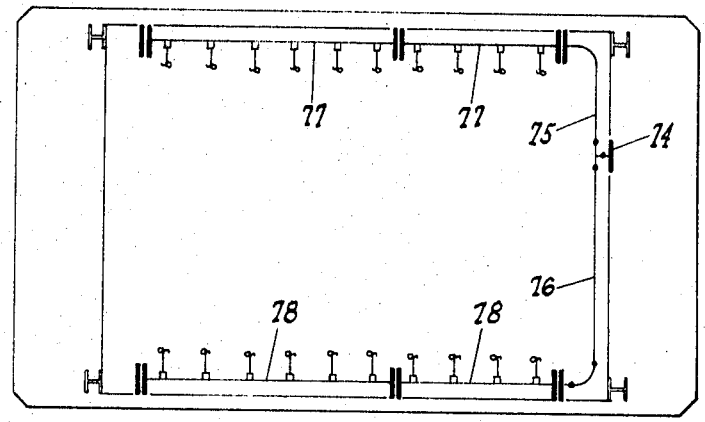
Figure 15D:
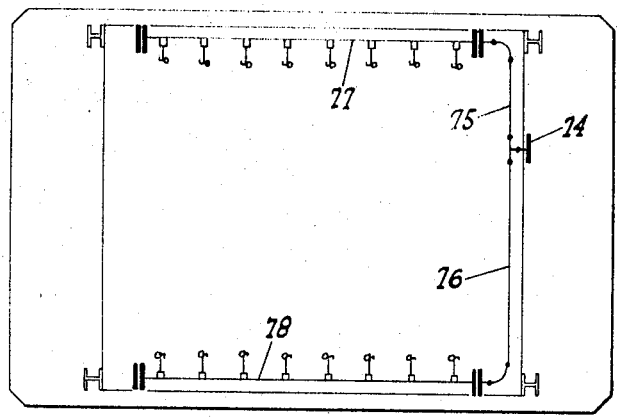

FIGS. 15a through 15e illustrate diagrammatically various modular embodiments of the inlet headers 77 and 78. FIGS. 15a through 15d illustrate inlet headers from 2, 4, 6 and 8 tube harps. FIG. 15e shows an exemplary inlet header arrangement for a reformer furnace having twenty tubes (a six and a four tube harp on each side) which is accomplished by the combination of inlet header modules of the type illustrated in FIGS. 15b and 15c.

*Products of combustion*

As has been indicated the furnace is fired by means of burners extending through selected ones of the side panels (in the positions shown at 39 in FIG. 6a, for example) or in the hearth (as indicated at 39a in FIG. 10). The burners are fed with air and a gaseous or other mobile fuel. The use of naphtha or light fuel oils may be found advantageous in certain localities.

Exit means must be provided for the products of combustion. A stack is indicated at 9 in FIG. 1, and a stack construction is detailed in FIG. 16. Here it will be seen that the arch or roof 73 of the furnace formed from refractory blocks suspended from an overhead framework (as in FIG. 9) is divided longitudinally into two separated portions 73a and 73b. Above the inner edges of the arch portions use may be made of spaced refractory blocks 89 and 90 shaped to receive a flue casing 91 which may be lined with insulating material 92 and refractory 93. The casing itself may be supported between beams 17a forming a part of the upper framework (see FIGS. 2, 3 and 10). The products of combustion pass between the spaced edges of the arch and through the flue casing. Any desirable flue construction may be connected with the casing.

It will be understood by one skilled in the art that it would be within the scope of the invention to provide a flue gas outlet in the furnace hearth (as at 9a in FIG. 10) or in an end wall of the furnace (not shown).

The furnace body including the arch or roof should be reasonably gas-tight. Sealing between adjacent panels and between panels and corner wall members can be done by applying a semi-rigid refractory sealant to meeting edges of the refractory linings thereof if the furnace is large enough to permit the entrance of workmen. Otherwise sealing is best accomplished from the outside. The construction of the furnace of the present invention is such that the panels need not be held in place by the sealant, so that a soft resilient sealing material, used simply to close the gap between adjacent panels, may be employed. Thus, for purposes of inspection or repair, the panels can be easily removed since the sealant can easily be removed and replaced. The mating flanges 28 may be welded together or gasket material may be placed between them when they are fastened together. Yet again it is possible to effect sealing by means of a structure which will lap the edges of the mating flanges and be sealed thereagainst by a compressible or gasket-like material. The lapping means may be rigid and metallic or flexible as desired.

The arch or roof itself should be sealed against gas leakage. This may be done in various ways. One way is to cover the top surfaces of the blocks making up the arch with a layer of insulative, heat resistant and preferably fiberous material as indicated at 94 in FIG. 16. This material should not only be relatively impervious to gases at the temperatures of the products of combustion, but it should be sufficiently resilient or distortable to seal against the protruding ends of the catalyst-carrying tubes.

A way of effecting an inside seal between the bottoms of the panel members and the hearth element, as well as between the tops of the panel members and the arch or roof edges has already been outlined (see 38 in FIGS. 10 and 11).

*Alternative catalyst tube construction*

FIGS. 17 through 21 relate to the modular furnace of the present invention with eductor type catalyst tubes rather than with harps as described above. As shown in FIG. 17 this structure comprises an elongated outer tubular member or catalyst-carrying tube 95 with its bottom end closed as at 96. The upper end of the catalyst tube 95 is provided with an opening 97 and an annular flange 98. Near the top of the tube 95 there is a laterally extending tube member 99. This member 99 extends part way into the catalyst tube 95 and is affixed thereto by any suitable means including welding or the like as at 100.

A gas outlet or eductor tube 101 passes through the tube 99 and extends axially and downwardly within the catalyst tube 95. The educator tube 101 may be affixed to the tube 99 by any suitable means such as welding or the like as at 102. The lowermost end of the eductor tube is closed by a plug means 103 and provided with a plurality of perforations 104 in its side walls near its plugged end. The catalyst tube 95 may be provided with inwardly directed guide means 105 adapted to hold the eductor tube in its axial position.

The flange 98 of the catalyst tube 95 is provided with an annular seat 106 for the receipts of an annular gasket means 107. An inlet connection 108 (more fully described hereinafter) is provided with a flange 109. The flange 109 may be affixed to the inlet connection 108 in any suitable gas-tight manner including threading, welding or the like. The flange 109 is provided with an enlarged portion 109a adapted to cooperate with the seat 106 to insure uniform compression of the gasket 107. The flange 109 may be removably affixed to the flange 98 by means of bolts 110.

In operation, the annular space between the eductor tube and the tube 95 (generally indicated at 111) is filled with a suitable catalyst. Feed gas is introduced through the inlet tube 108 and is caused to pass downwardly through the catalyst bed. At the bottom of the tube 95 the reaction products enter the eductor tube 101 through the perforations 104.

FIGS. 18 and 19 illustrate the inlet headers and inlet connections for the eductor type catalyst tubes. It will be noted that the roof or arch 4 may be made up of blocks as described above. The eductor type catalyst tubes will be staggered in much the same way as the catalyst tubes in the harps described above. While the eductor type catalyst tubes may be suspended from the furnace frame, they also may be supported by the hearth and require no suspension at the top, so that they are free to expand and contract longitudinally through the arch.

Inlet means for the educator type catalyst tubes comprise an inlet connection 112 for the inlet manifolds 113 and 114 which extend longitudinally along the top of the furnace. The inlet manifolds 113 and 114 are provided with permanently affixed connections 113a and 114a respectively. The connecting means 113a and 114a, are in turn, removably connected in a gas-tight fashion to the inlet connections 108 of the catalyst-carrying tubes. This removable connection is illustrated at 115 and 116. The inlet connections 108 are so configured as to permit longitudinal expansion and contraction of the eductor type catalyst tubes.

FIGS. 20 and 21 illustrate the outlet manifolds and connections for the eductor tubes. Outlet means for the eductor tubes comprise outlet manifolds 117 and 118 extending longitudinally along the upper edge of the furnace. The outlet manifolds 117 and 118 are provided with permanently affixed connection means 117a and 118a respectively, which in turn are removably connected to the oulet tubes 101. These removable gas-tight connections are indicated at 119 and 120. It will be noted that the connections 117a and 118a as well as the eductor tubes 101 are so congfured as to permit longitudinal expansion and contraction of the eductor type catalyst tubes.

It will be noted from the above description that catalyst may be introduced into or removed from the eductor type catalyst tubes by simply disconnecting the inlet connections 108 at 115 and 116, and disconnecting the flange 109 from the flange 98 of each. Disconnection of both the inlet connection 108 and the eductor tubes 101 permit easy removal or replacement of the eductor type catalyst tubes.

*Modular aspects*

The modular aspects of the structure herein described have a number of salient advantages:

(1) The parts may be standardized, which makes it possible to repair or replace individual parts, inclusive of panel members, hearth members, harps or eductor tubes, and refractory and insulation without tearing down the entire furnace.

(2) The standardization of modules permits the construction of furnaces of different effective sizes and capacities from modules, so that it becomes possible to alter the size of a furnace without dismantling it completely. Also the use of standardized modules makes the initial construction more economical.

(3) The use of standardized modules facilitates the provision of furnace structures which can be assembled in the manufacturer's plant and handled and shipped as packaged units.

(4) The modular furnace of the present invention includes unit panel construction of side and end walls of the furnace, having interchangeable panels of convenient size for maintenance handling, inspection or replacement. The panel width dimension is in a simple proportion to or multiple of the tube center-to-center spacing in the harp such as 2:1. This simple relationship makes possible a truly modular design and construction so that tubular heating furnaces of a wide range of sizes can be built from the same modular components arranged in different combinations. The thermal and process performance of a wide range of furnaces can be predicted closely since the basic relationship and geometry of one pair or other small modular number of tubes to its adjacent side wall panels containing heat sources such as burners is virtually the same over a wide range of overall furnace lengths. In this case the cross sectional dimensions of one series of furnaces remains constant, only the length of the furnace, and total length of tube harps or number of eductor tubes change, within the same series of furnaces designed to accomplish a similar chemical reaction or thermal processing condition.

(5) The modular panel design permits repetitive construction in shop or field of a minimum number of different pieces or common shapes to build furnaces of various sizes and capacities. Modular panel units are added side-by-side to build furnaces of any reasonable size.

(6) The modular design furnace is efficiently adapted to shop fabrication to a higher degree of completion of assembly than previous designs; this makes it possible for the furnace to be shipped conveniently to locations as a unit package requiring a minimum amount and variety of skilled workmen and field operations to put the furnace into operation.

(7) Standardization of the modular furnace components makes it possible for the furnace operator or user to stock a minimum number of different parts as spares for quick and easy maintenance.

(8) The present modular furnace design with vertical parallel tube harps arranged symmetrically about the horizontal center line of the furnace, and with moderate spacing between harps permits the flue gas offtakes to be placed in symmetrical arrangement also in the form of central longitudinal slots either at the top or the bottom of the furnace as may be dictated by the furnace application, the arrangement of auxiliary heat recovery apparatus or other requirements.

(9) Since the slots extend virtually the full length of the furnace, whether located at top or bottom, this results in uniformly distributed flow of flue gas in all parts of the slot leading to a vestibule or hot gas duct so designed that the uniform distribution of gases through the slot is preserved. The uniform distribution of hot gases flowing over the tube harps or eductor tubes contributes substantially to the uniformity of heat transfer to the various portions of the exposed surfaces of the tubes, most especially in the applications of the present furnace designs at relatively lower temperature levels where the proportionate effect of convective heat transfer is greater, and where radiant heat transfer is not so predominant as in the case of furnaces operating at higher temperatures.

(10) The harp design with all tubes strongly welded to a manifold at the bottom end minimizes expansion problems, and elaborate spring hangers previously found necessary for tube supports at top of tubes are not needed. At the top of each harp the tubes are not in fixed restraint, but are free to expand upward, individually.

(11) The tubes in a harp or the eductor tubes on one side of the furnace are staggered with respect to those on the other side of the furnace to prevent substantial "shadowing" of one tube by another tube between the former tube and the source of radiant heat energy.

(12) The pipes conducting the reactant mixture of steam and hydrocarbon to the inlet of each tube and the pipe or alloy tubing conducting the reactor tube effluent from each harp manifold are of small diameter to provide ample flexibility for expansion, yet are of sufficient size that at moderately high gas velocity, pressure drop through the connectors is not excessive.

(13) The top flanged closure of each tube is arranged so that tubes may be opened individually for inspection, removal or replacement of catalyst with the tube harp undisturbed from its normal operating position. The catalyst is easily removed as in previous practice with vertical tubes by a "vacuum cleaner" device or other suitable means.

Modifications may be made in the invention without departing from the spirit of it. For example, the addition of elements desirable in a reformer or other catalytic furnace may be accomplished as desired. While a furnace has been shown having inlet and outlet headers, and normally requiring that the reactants be preheated outside by external means, a preheating means, usually a sinuous conduit, may be included in the furnace.

The embodiments of the invention in which an exclusive property or privilege is claimed are defined as follows:

1. In a modular reformer furnace, the combination of a base member presenting a refractory upper surface forming a hearth, a series of metal wall panel members having refractory surfacing means on one side thereof, means for holding said wall panel members in a vertical position with their lower ends supported on edge portions of said base member, there being at two opposite edge portions of said base member at least one of said wall panel members so supported, vertical metal corner panel members with refractory surfacing means on one side thereof, said corner panel members in association with said wall panel members forming a furnace enclosure, the vertical edge portions of said wall panel members and said corner panel members being removably sealed together, a series of vertically extending catalyst tubes, the said tubes being in parallel spaced relationship to each other and to the opposite panel members, and burner means, the said furnace having a refractory roof suspended on means extending across the furnace enclosure, the upper ends of said catalyst tubes extending through perforations in said roof and having inlet means located thereabove.

2. The structure claimed in claim 1 wherein said catalyst tubes are closed at the bottom and have interior ductor tubes therein.

3. The structure claimed in claim 1 wherein said catalyst tubes are supported by said hearth.

4. The structure claimed in claim 1 wherein said catalyst tubes are suspended from said means extending across said furnace for suspending said roof.

5. The structure claimed in claim 1 wherein said catalyst tubes form harps, each harp having a bottom manifold interconnecting a plurality of such catalyst tubes, said manifold lying along and supported by said hearth.

6. The structure claimed in claim 1 wherein said burners are radiant burners in the said wall panel members.

7. The structure claimed in claim 1 wherein said burners include burners located in the hearth of said furnace.

8. The structure claimed in claim 1 wherein a layer of insulating block is affixed to the inside surfaces of said wall panel members and said corner panel members, said refractory surfacing means comprising a layer of castable refractory cast on said layer of insulating block, and means for holding said layers in place.

9. The structure claimed in claim 1 including a flue opening through one of the aforementioned furnace enclosure elements.

10. The structure claimed in claim 1 including a flue opening through said hearth.

11. The structure claimed in claim 5 including outlet means for said bottom manifolds, said outlet means extending from said manifolds to the exterior of said furnace enclosure through selected ones of said wall panel members and said refractory surfacing means, said selected wall panel members being notched to permit passage of said outlet means.

12. The structure claimed in claim 5 wherein said catalyst tubes are attached to said manifolds to form said harps such that the tubes of each harp are spaced at equal tube center to tube center distances.

13. The structure claimed in claim 5 wherein said harps in parallel spaced relationship are longitudinally offset with respect to each other, said tube centers of said parallel harps being staggered with respect to each other.

14. The structure claimed in claim 13 wherein the width of said wall panel members is in simple mathematical proportion to said tube center to tube center distance.

15. The structure claimed in claim 14 wherein the size of said modular reformer furnace depends upon the number of wall panels used therein, and the number of wall panels depends upon the number of catalyst tubes contained therein.

16. The structure claimed in claim 14 wherein said corner panels are of two types, one of said types comprising a corner panel with side portions of equal width meeting at a right angle, the other type comprising a corner panel with side portions meeting at a right angle, one of said side portions being wider than the other, said modular reformer furnace having two corner panels of each type, located at diametrically opposite corners, whereby said parallel spaced harps may be longitudinally offset within said furnace.

17. In a modular reformer furnace, the combination of a base member presenting a refractory upper surface forming a hearth, a series of metal wall panel members having refractory surfacing means on one side thereof, means for holding said wall panel members in a vertical position with their lower ends supported on edge portions of said base member, there being at two opposite edge portions of said base member at least one of said wall panel members so supported, vertical metal corner panel members with refractory surfacing means on one side thereof, said corner panel members in association with said wall panel members forming a furnace enclosure, the vertical edge portions of said wall panel members and said corner panel members being removably sealed together, harps each including a bottom manifold extending along and supported from said hearth and a series of vertically extending catalyst tubes attached to said manifold, the said harps being in parallel spaced relationship to each other and to the opposite panel members, certain of said opposite panel members carrying radiant burner means, the said furnace having a refractory roof suspended on means extending across the furnace enclosure, the upper ends of said catalyst tubes extending through perforations in said roof and having inlet means located thereabove, said base member comprising a skid, a framework affixed to said skid and surrounding said furnace, said framework supporting said side wall panels, said corner panels and said means from which said roof is suspended.

18. The structure claimed in claim 17 wherein said modular reformer furnace comprises a liftable and transportable unit.

19. In a modular reformer furnace, the combination of a base member presenting a refractory upper surface forming a hearth, a series of metal wall panel members having refractory surfacing means on one side thereof, means for holding said wall panel members in a vertical position with their lower ends supported on edge portions of said base member, there being at two opposite edge portions of said base member at least one of said wall panel members so supported, vertical metal corner panel members with refractory surfacing means on one side thereof, said corner panel members in association with said wall panel members forming a furnace enclosure, the vertical edge portions of said wall panel members and said corner panel members being removably sealed together, harps each including a bottom manifold extending along and supported from said hearth and a series of vertically extending catalyst tubes attached to said manifold, the said harps being in parallel spaced relationship to each other and to the opposite panel members, certain of said opposite panel members carrying radiant burner means, the said furnace having a refractory roof suspended on means extending across the furnace enclosure, the upper ends of said catalyst tubes extending through perforations in said roof and having inlet means located thereabove, means for movably sealing said upper ends of said catalyst tubes in said perforations whereby said tubes may expand longitudinally and upwardly through said perforations.

20. The structure claimed in claim 19 wherein said inlet means comprise headers for said parallel spaced harps, an inlet tube connecting the upper end of each of said catalyst tubes with one of said headers, said inlet tubes being looped whereby said connections will be unaffected by said expansion of said catalyst tubes.

References Cited

UNITED STATES PATENTS

| | | | |
|---|---|---|---|
| 2,279,192 | 4/1942 | Brandt | 196—110 X |
| 2,656,157 | 10/1953 | Wasielewski | 122—235 X |
| 2,660,519 | 11/1953 | McCarthy | 23—288 |
| 2,944,876 | 7/1960 | Polk | 23—288.92 |
| 2,988,063 | 6/1961 | Vorkauf | 122—494 X |
| 3,012,548 | 12/1961 | Guszmann | 122—235 |
| 3,062,197 | 11/1962 | Fleischer. | |
| 3,172,739 | 3/1965 | Koniewiez | 23—288 |
| 3,212,861 | 10/1965 | Whitesides | 23—288 |

JOSEPH SCOURONEK, *Primary Examiner.*

U.S. Cl. X.R.

23—277; 48—196; 122—356, 510